ially extending side members
supported by wheels at the outer ends thereof. An
elongated tine, located between the side members, is
attached on the front frame by a parallelogram-type
linkage means for lifting and carrying a load thereon.
One pair of links forming the linkage means comprise
hydraulic cylinders adapted to selectively tilt the tine
to enable the load to be more easily picked up and retained while being carried.

United States Patent
Grooss

[11] 3,921,833
[45] Nov. 25, 1975

[54] MATERIAL LIFTING AND TRANSPORTING VEHICLE
[75] Inventor: Frank A. Grooss, Morton, Ill.
[73] Assignee: Caterpillar Tractor Co., Peoria, Ill.
[22] Filed: June 22, 1973
[21] Appl. No.: 372,651

Related U.S. Application Data
[62] Division of Ser. No. 183,778, Sept. 27, 1971, Pat. No. 3,762,590.

[52] U.S. Cl............................ 214/130 C; 214/750
[51] Int. Cl.²......................................... B66C 23/00
[58] Field of Search ............ 214/130 C, 750, 77 P, DIG. 10; 180/51

[56] References Cited
UNITED STATES PATENTS

| | | | |
|---|---|---|---|
| 2,391,224 | 12/1945 | Carter | 214/DIG. 10 |
| 2,656,058 | 10/1953 | Foote | 214/77 P |
| 2,684,164 | 7/1954 | Violette | 214/750 |
| 3,334,702 | 8/1967 | Granryd | 180/51 |
| 3,474,921 | 10/1969 | Rossoni | 214/77 P |
| 3,602,381 | 8/1971 | Size et al. | 214/77 P. |
| 3,739,930 | 6/1973 | Hardwick | 214/130 C |

Primary Examiner—Robert J. Spar
Assistant Examiner—Ross Weaver
Attorney, Agent, or Firm—Phillips, Moore, Weissenberger, Lempio & Strabala

[57] ABSTRACT
An articulated vehicle is provided with a bifurcated front frame having forwardly extending side members supported by wheels at the outer ends thereof. An elongated tine, located between the side members, is attached on the front frame by a parallelogram-type linkage means for lifting and carrying a load thereon. One pair of links forming the linkage means comprise hydraulic cylinders adapted to selectively tilt the tine to enable the load to be more easily picked up and retained while being carried.

4 Claims, 12 Drawing Figures

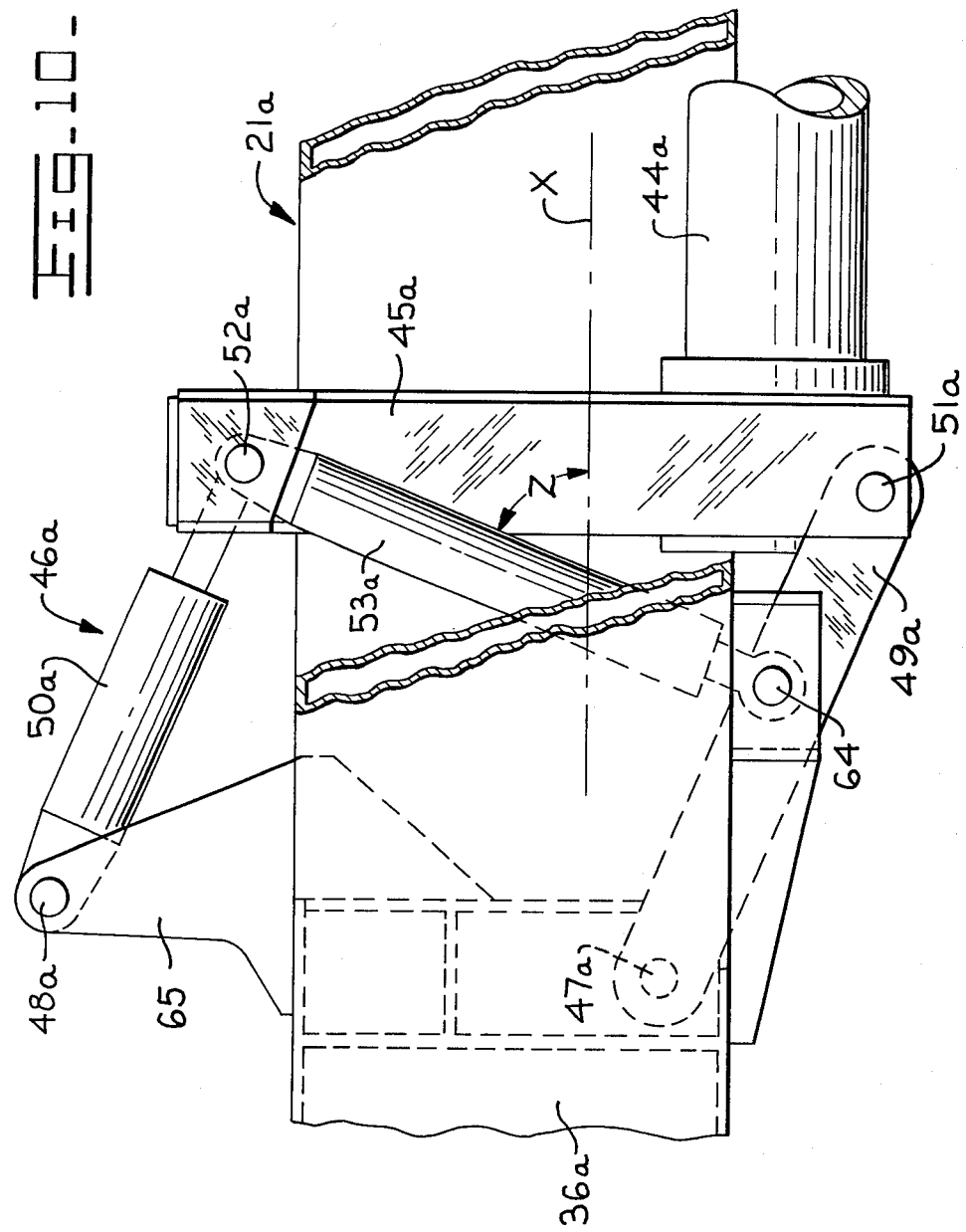

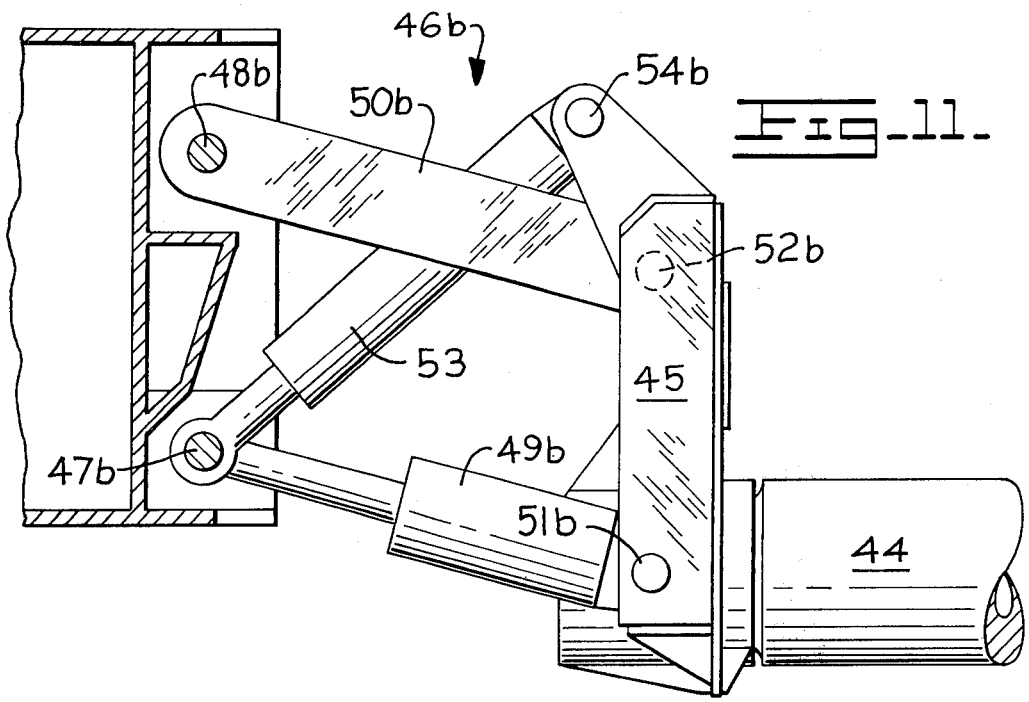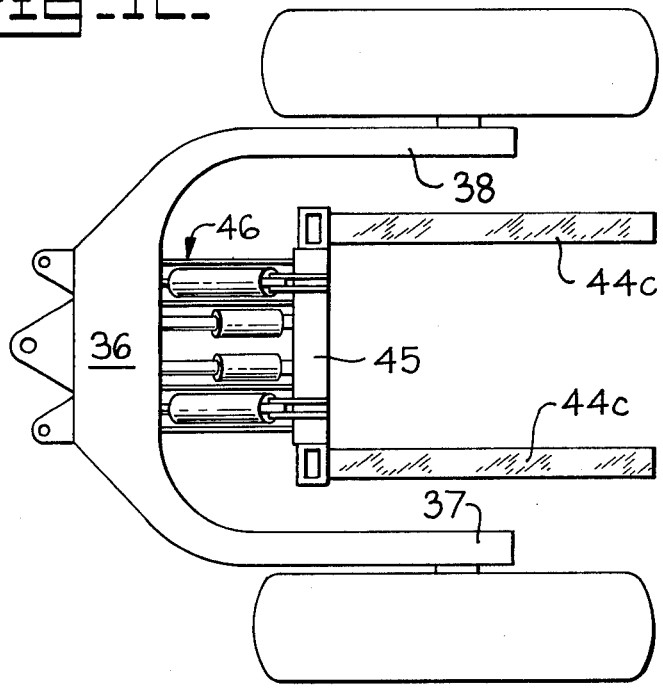

MATERIAL LIFTING AND TRANSPORTING VEHICLE

This is a division of application Ser. No. 183,778, filed Sept. 27, 1971, now U.S. Pat. No. 3,762,590.

BACKGROUND OF THE INVENTION

This invention relates to material lifting and transporting vehicles of the type having a forwardly disposed and vertically movable tine member.

The handling and transporting of sizeable loads, such as large steel coils or rolls, and other tubular loads, gives rise to stability, safety and maneuverability problems, particularly when the load is transported over uneven terrain, such as rail crossings, poorly surfaced roadways, and nonpaved storage areas. Existing fork lift vehicles have failed to fully overcome such problems and are generally cumbersome to operate, especially when precise maneuvering is required during loading and unloading. Also, the lift tower of many such vehicles is normally placed directly in front of the operator to hinder his visibility, particularly detrimental especially during high speed travel operations.

Conventional straddle type carry trucks normally position the operator directly over the load which is carried thereby. Such positioning impairs the operator's visibility of the load during loading, unloading and transport operations. Also, the operator is subjected to uncomfortable conditions and possible injury when materials, such as hot steel coils having temperatures ranging up to 1500°F., are handled and transported. Furthermore, straddle type carry trucks have an especially high center of gravity which necessitates slower travel speeds.

SUMMARY OF THIS INVENTION

This invention overcomes the above, briefly described problems by providing a material lifting and transporting vehicle exhibiting improved maneuverability, stability, visibility, safety, ride and endurance. The vehicle comprises a front frame having forwardly extending tine means attached thereto, preferably by a parallelogram type linkage. Actuating means, pivotally interconnected between the frame and tine means, functions to selectively move the tine means vertically for material handling and transporting purposes.

Novel features of this invention comprise the utilization of at least one extensible and retractable link or hydraulic cylinder integrated into the linkage for selectively tilting the tine means; pivotally connecting the lower end a vertically disposed cylinder of the actuating means at a strategic point on the front frame to provide a vertical lift component of substantial magnitude; and providing a structurally rugged and quick-detach mounting means between the tine means and a support means therefor.

BRIEF DESCRIPTION OF THE DRAWINGS

FIG. 10 is a view similar to FIG. 4, but illustrating a modification of the linkage mechanism;

FIG. 11 is a similar view, but illustrating a further modification of the linkage mechanism; and FIG. 12 is a partial top plan view illustrating a modification of the tine employed in the FIG. 1 vehicle.

DESCRIPTION OF THE PREFERRED EMBODIMENTS

Figure 1:
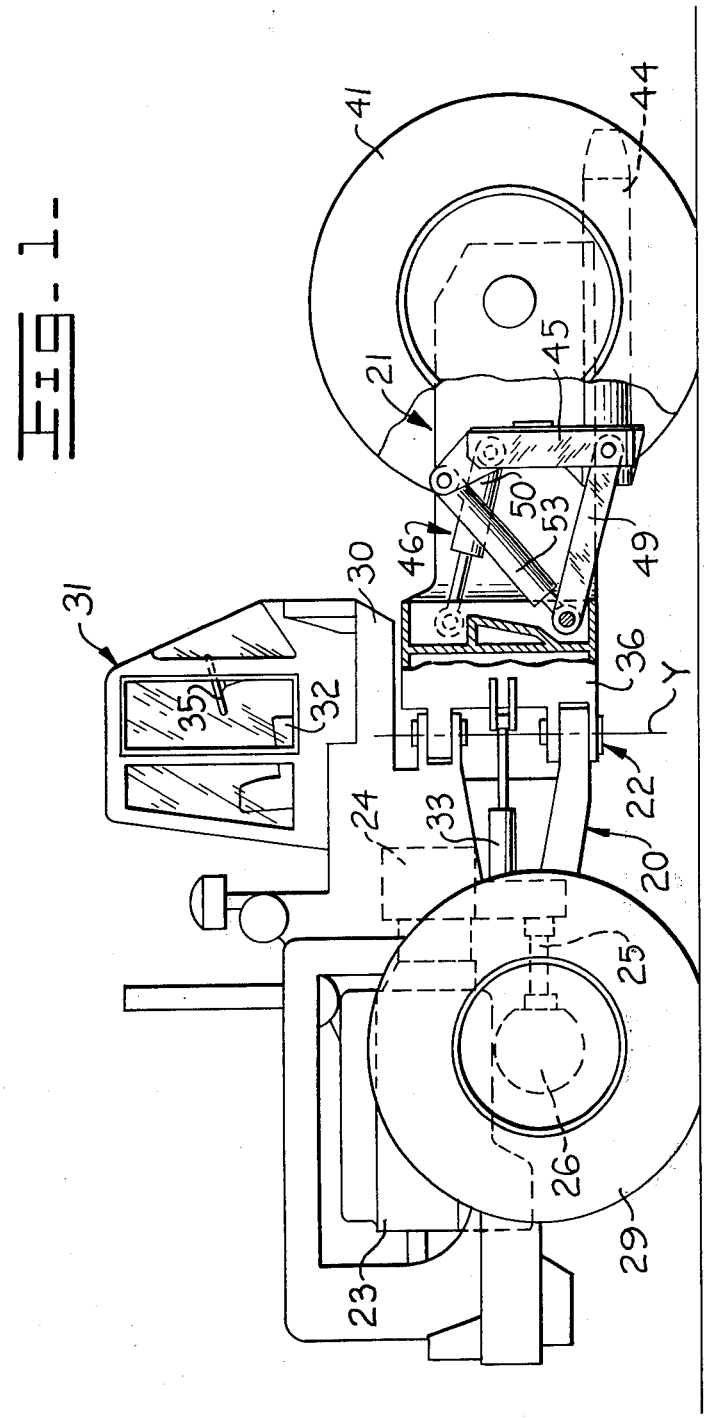
FIG. 1 is a side elevational view of an articulated material lifting and transporting vehicle with portions broken away to expose the tine support structure and its attendant linkage mechanism.
Figure 2:
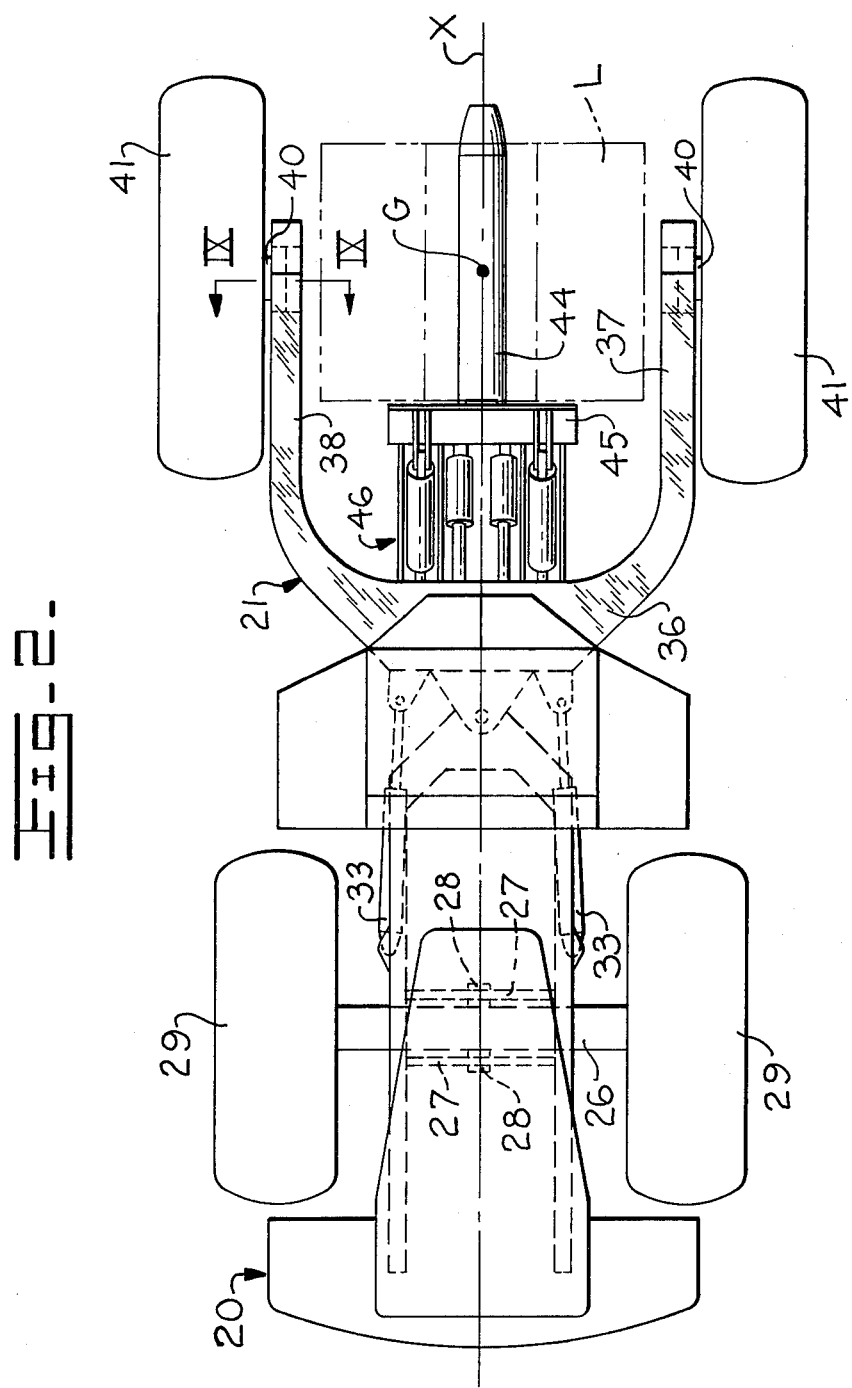
FIG. 2 is a top plan view of the vehicle.

Referring to FIGS. 1 and 2, a material lifting and transporting vehicle is normally disposed on a longitudinal axis X thereof. The vehicle includes a rear frame 20 articulated to a front frame 21 for relative movement about an upright axis Y, defined by a conventional hitch means indicated generally at 22. An engine 23 is supported on the rear frame to supply power through a power train comprising a transmission 24, a universal drive connection 25 and a rear drive axle structure 26.

The drive axle structure supports the rear frame 20 by a pivot connection comprising brackets 27, secured to the frame, and engaging pivot pins 28 secured to the axle structure. The pivotal connection of the rear frame to the axle structure permits them to oscillate relative to each other about longitudinal axis X. Wheels 29 are attached to the axle structure to be driven thereby in a conventional manner.

Rear frame 20 has an extension (FIG. 1) disposed over pivot axis Y to support an operator's station. The operator's station includes a substantially raised seat 32 to provide the operator with greater visibility and to sufficiently remove him from the transported load to prevent injury therefrom. Seat 32 is substantially aligned with pivot axis Y to provide the operator with a relatively stationary position during the steering phase of vehicle operation to further improve ride characteristics and visability.

Steering of the vehicle is effected by selective adjustment of the angular relationship between frame members 20 and 21, about axis Y. Steering means, such as a pair of doubleacting hydraulic cylinders 33 provided on either side of the vehicle, accomplish the steering function. The cylinders are pivotally connected at their rod ends to front frame 21 and at their other ends to rear frame 20. A conventional hydraulic steering pump (not shown) is responsive to the position of a steering wheel 35 to automatically direct pressurized hydraulic fluid to the cylinders.

Front frame 21 is generally U-shaped (FIG. 2), and comprises a base portion 36 having laterally spaced side members 37 and 38 extending forwardly therefrom. The front frame components may comprise a box-type construction providing sufficient rigidity to support a prescribed load without bending or deflection. A pair of stub axles 40 are rigidly attached to the forward ends of the side members to rotatably mount a pair of wheels 41 thereon. Such wheels, comprising large pneumatic tires, are preferably substantially larger than rear wheels 29 to improve the riding characteristics of the vehicle and to readily support heavy, transported loads.

Figure 9:
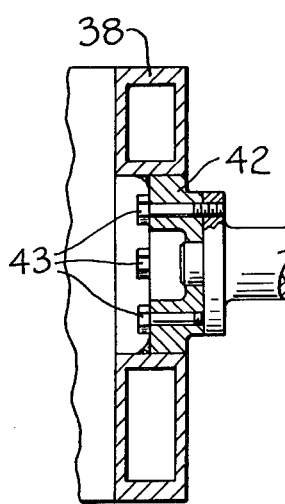
FIG. 9 is a cross sectional view, taken along line IX-IX in FIG. 2, showing the mounting of a stub axle to a frame of the vehicle.

As shown in FIG. 9, each stub axle 40 has one end thereof piloted into an axle mounting flange 42 and attached thereto as by bolts 43. The flange is received into an opening suitably formed in frame side member 38 and welded or otherwise retained therein. Wheels 41 are conventionally mounted on the free ends of the stub axles. Although wheels 41 are illustrated in FIG. 9 as being non-power driven, it should be readily apparent to those skilled in the art that power can be transmitted thereto for driving purposes.

Figure 3:
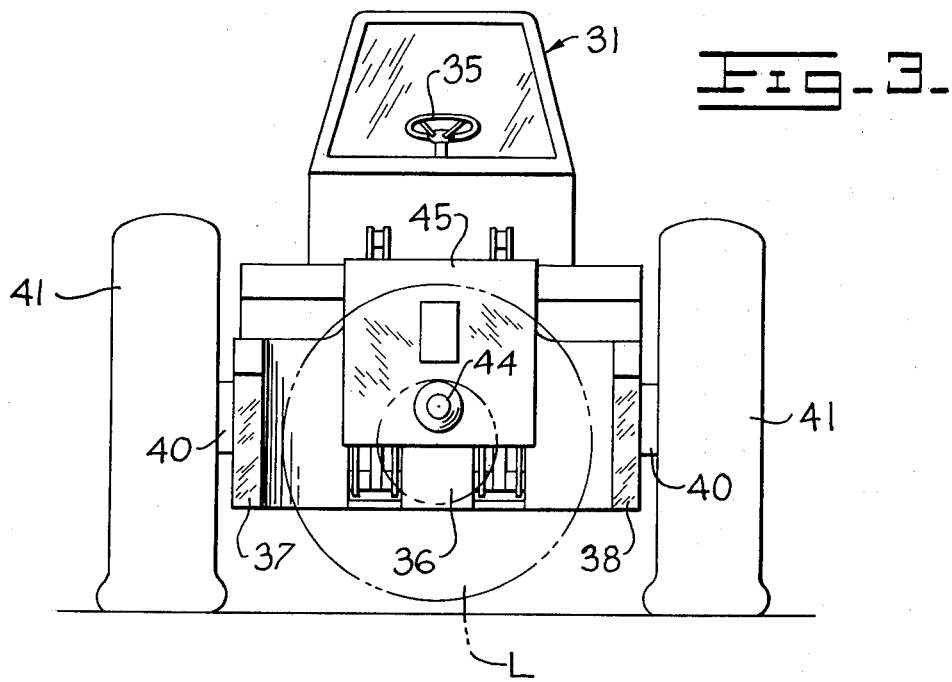
FIG. 3 is a front elevational view of the vehicle.

A load supporting means, such as an elongated tine means 44 is preferably disposed intermediate side members 37 and 38 (FIGS. 2 and 3). The tine means is attached to a support means or tine support structure 45, suspended from base portion 36 of frame 21, by a four bar or parallelogram-type linkage means 46. Such disposition of the tine means permits a center of gravity G of a heavy load L (FIG. 2) to be positioned substantially intermediate wheels 41 in both the longitudinal and transverse directions. It is, therefore, possible for the integrated vehicle to carry a heavier load than a conventional vehicle of comparable size, and to eliminate the counterweights employed with those vehicles having the center of gravity of their load positioned substantially ahead of their front wheels.

Figure 4:
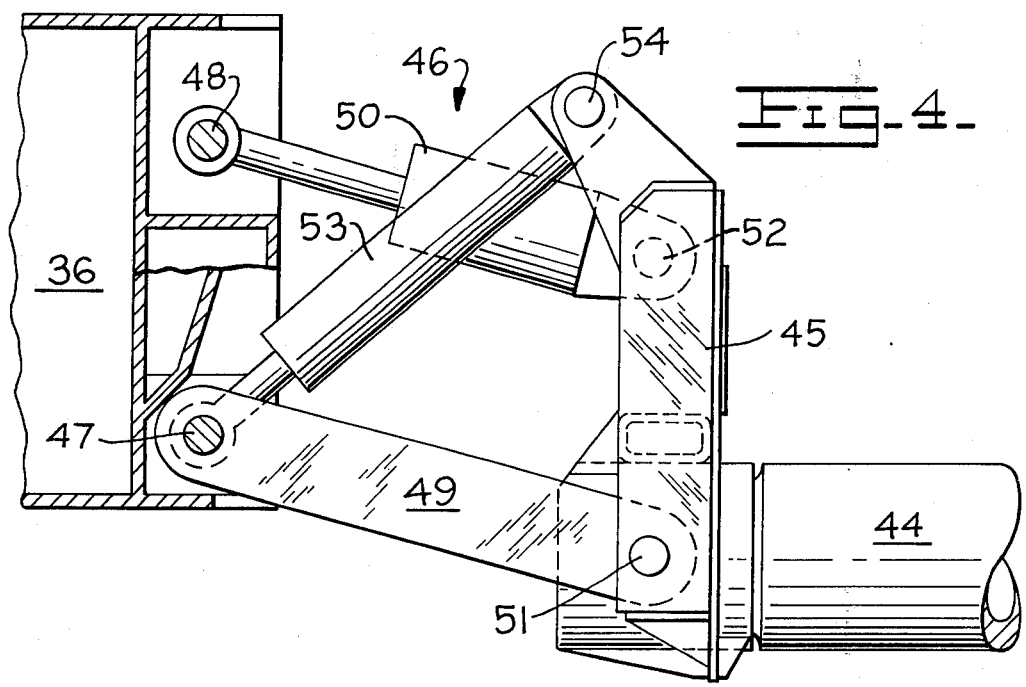
FIG. 4 is an enlarged view of the linkage mechanism shown in FIG. 1.
Figure 5:
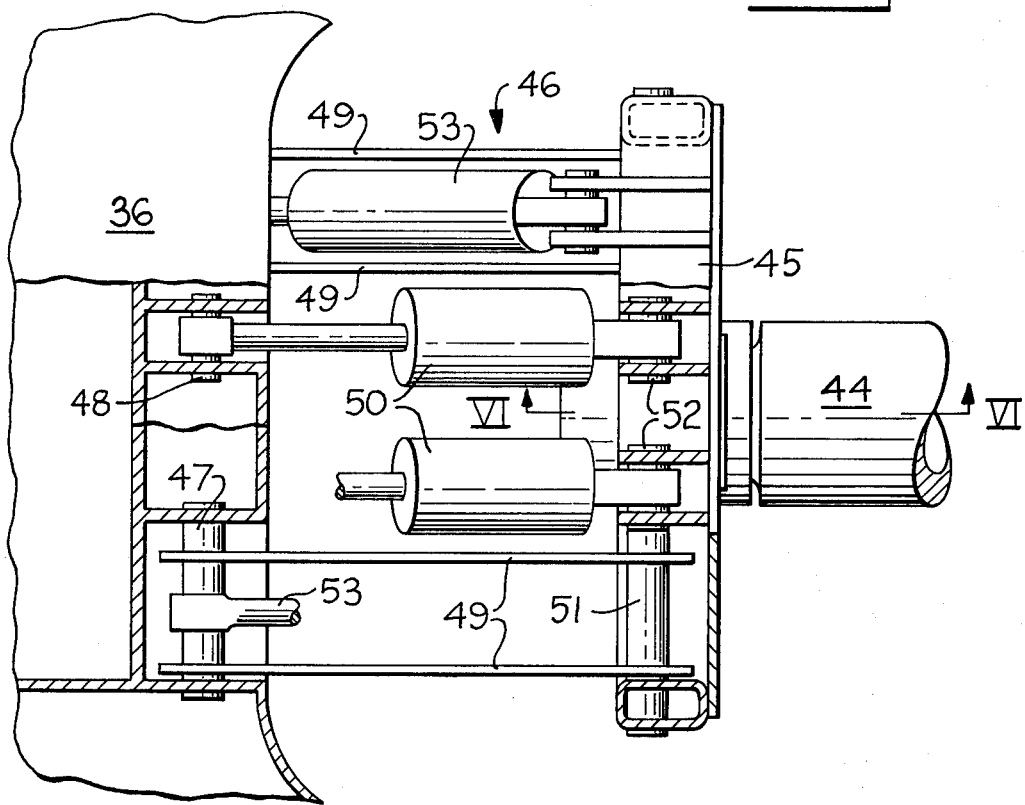
FIG. 5 is a top plan view of the linkage mechanism.

As best shown in FIGS. 4 and 5, base portion 36 is provided with upper pivot means or pins 48 and lower pivot means or pins 47 for pivotally attaching substantially parallel pairs of links 49 and 50 of linkage means 46 thereto. The two pairs of links 49 have fixed lengths whereas the inboard pair of link means 50 comprise extensible and retractable doubleacting hydraulic cylinders or actuators. Pins 51 and 52 pivotally connect the second ends of links 49 and 50, respectively, to tine support structure 45. The distance between pins 47 and 48 is substantially the same as the distance between pins 51 and 52 to substantially define the parallelogram type linkage with links 49 and 50. Selective extension or retraction of cylinders 50 functions to tilt tine means 44 relative to horizontal to enable the operator to readily pick-up load L (FIG. 2) and rock it backwards to prevent the load from falling off the tine means during transport.

A pair of double-acting hydraulic cylinders 53 are pivotally attached to base portion 36 by pins 47 and to support 45 by pins 54. Selective extension or retraction of cylinders 53 functions to raise or lower, respectively, tine support structure 45 relative to the vehicle.

Figure 6:
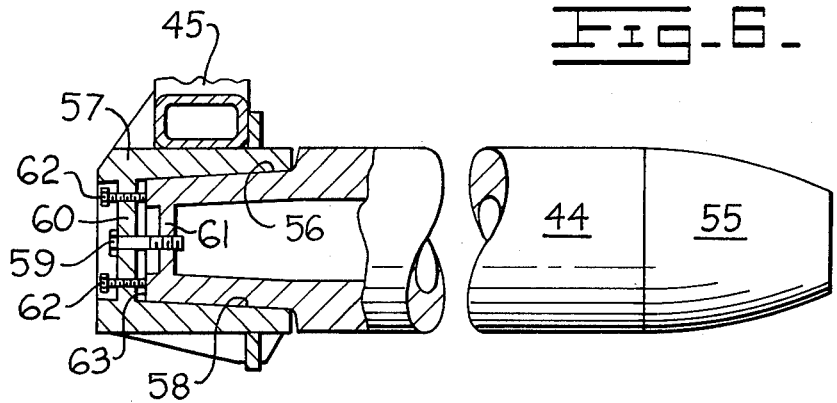
FIG. 6 is a cross sectional view of a tine retaining means, taken along line VI—VI in FIG. 5.

As best shown in FIG. 6, the illustrated tine means embodiment comprises a single tine member having a substantially circular cross section terminating at its free, forward end in a tip 55 and at its rearward end in a tapered or conically shaped surface 56. The tine is preferably hollow to reduce its weight and to provide a structure which resists bending forces placed thereon by the load. Support structure 45 is provided with a tine mounting means comprising a sleeve member 57 having a tapered or conically shaped bore 58 for receiving mating tapered end 56 of the tine.

A bolt or securing means 59 extends through a wall member 60 of sleeve 57 and threadably engages a wall member 61 of tine 44 whereby tightening of the bolt will draw tapered end 56 into tight engagement with tapered bore 58 of sleeve 57. The tine mounting means permits the tine to be rotated when the upper, load engaging surface of tine 44 becomes worn or when the tip becomes bent or distorted due to excessive loading or heating by its engagement with hot steel coils. The mounting means also facilitates expenditious removal of the tine for replacement purposes.

To accomplish rotation or removal of the tine, bolt 59 is first loosened or removed and bolts or releasing means 62, threadably secured in the wall member 60, are then rotated clockwise to engage end surface 63 of the tine. Further rotation of bolts 62 will function to move the tine rightwardly in FIG. 6 and out of contact with tapered bore 58 of sleeve 57. The tine can then be easily rotated any desired amount or completely removed.

Figure 7:
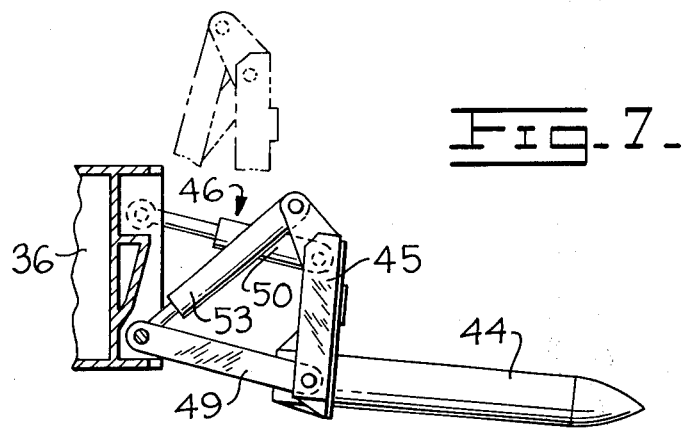

In operation, with links 49 and 50 of parallelogram type linkage means 46 normally disposed to have substantially the same lengths (FIG. 1), tine means 44 will remain substantially horizontal when it is raised vertically upon extension of cylinders 53. In actual practice, however, it has proved advantageous to selectively tilt the tine, relative to horizontal, between its FIGS. 7 and 8 positions. In particular, FIG. 7 shows the tine tilted downwardly to enable the operator to properly align the tine with a hole, defined through the center of steel coil or load L (FIG. 2), for proper insertion therethrough upon forward movement of the vehicle. The operator may then retract cylinders 50 to tilt the tine upwardly (FIG. 8) to prevent the coil from inadvertently falling off the tine upon extension of cylinders 53 to the carry position.

FIGS. 10 and 11 are views similar to FIG. 4 illustrating modifications of the linkage means. Corresponding constructions and elements are depicted by like numerals, but with numerals appearing in FIGS. 10 and 11 being accompanied by an $a$ and $b$, respectively, to depict certain modifications.

Linkage means 46a of FIG. 10 essentially differs from the one illustrated in FIG. 4 in that a pair of double acting hydraulic cylinders 53a (one shown) are each pivotally connected to a tine support structure 45a by a pivot pin 52a and to a base portion 36a of a front frame 21a by a pivot pin 64. The cylinders are preferably disposed at least approximately perpendicular with respect to links 49a and 50a. Extensible and retractable link means 50a (one shown) are each connected by a pivot pin 48a to an upstanding bracket 65 secured to the base portion and by a pivot pin 52a to support structure 45a.

The generally vertical disposition of cylinders 53a provides a vertical lift component of substantial magnitude upon extension of the cylinders for raising support structure 45a and tine 44a. The angle Z, between the cylinders and horizontal axis X, may be selected from the range of from 50° to 80° in the position shown, so that when support structure 45a is in its highest position upon full extension of cylinders 53, angle Z approximates 90°. In addition, the composite movement arm reacting on the load carried by the tine is substantially increased over that utilized in the FIG. 4 linkage primarily due to the increased distance between links 49a and 50a.

The FIG. 10 linkage means also aids in reducing stresses in the links and reduces pivot pin loading. It should be further noted that the center line of tine 44 is now positioned above pivot pin 51a to more evenly distribute the load between links 49a and 50a. Pivot pin 64 is located on base portion 36a to normally provide the shortest possible horizontal distance between pivot pins 52a and 64, without permitting such pivot pins to move into an over-center relationship relative to each other upon full extension of cylinders 53a.

The four bar linkage mechanism 46a is further modified whereby the geometry thereof automatically tilts the tine backwards upon the extension of cylinders 53a to further aid in retaining the load.

Figure 8:
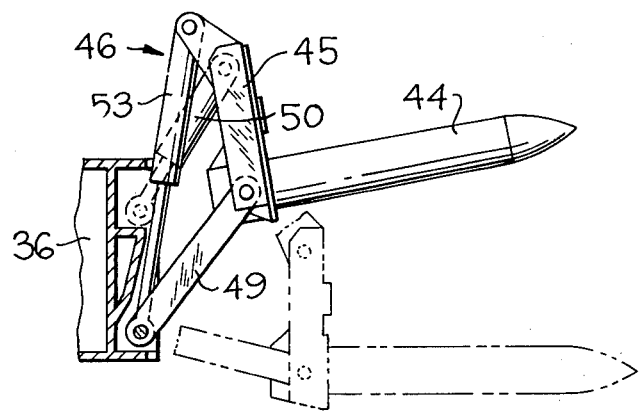
FIGS. 7 and 8 are views similar to FIG. 4, but showing the tine in various operating positions.

Linkage means 46b of FIG. 11 is substantially identical to the FIG. 4 linkage means, except that links 49b and 50b have been reversed. In particular, a pair of extensible links 49b (one shown) have been substituted in lieu of links 49 and two laterally spaced pairs of fixed length links 50b (one shown) have replaced cylinders 50. Thus it can be seen that selective tilting of the tine, as shown in FIGS. 7 and 8, is effected by lower links 49b, rather than by the upper links.

FIG. 12 illustrates a modification of the tine means whereby laterally spaced tines 44c have been substituted in lieu of single tines of the above-described embodiments. The tines may each comprise flat upper surfaces and a rectangular cross section of conventional design, adapted for lifting palletized materials such as steel plates.

I claim:

1. A material lifting and transporting vehicle having a front frame and normally disposed for movement along a longitudinal axis thereof,
    a. a generally horizontally disposed load supporting means positioned to extend in the direction of said axis,
    b. a generally vertically disposed support means having the load supporting means secured thereto, and
    c. linkage means operatively connecting the support means to the front frame for permitting the load supporting means to remain substantially horizontal upon vertical upward movement thereof,
    d. the linkage means including at least one first link pivotally interconnected between upper portions of the front frame and the support means and at least one second link, spaced vertically below the first link and normally disposed substantially parallel thereto, interconnected between lower portions of the front frame and the support means, and means for extending and retracting one of said links for selectively tilting the load supporting means relative to the horizontal, and
    e. actuating means pivotally interconnected between the second link and the support means for selectively moving the load supporting means vertically,
    f. said actuating means comprising at least one generally vertically disposed hydraulic cylinder pivotally connected at its lower end directly to said second link intermediate the ends thereof and between the pivotal connections for the second link and at its upper end to the upper portion of the support means.

2. The invention of claim 1 wherein said hydraulic cylinder is normally disposed at an angle relative to horizontal selected from the range of from 50° to 80° so that the angle does not exceed 90° upon full extension of said hydraulic cylinder.

3. The invention of claim 2 wherein the angle approximates 70°.

4. The invention of claim 1 wherein said hydraulic cylinder is disposed at least approximately perpendicular with respect to said links.

* * * * *